Sept. 1, 1964 D. C. SHERMAN 3,146,994
METHOD FOR THE CONTINUOUS STRINGING OF SPACER TYPE AERIAL CABLE
Filed Feb. 26, 1962 4 Sheets-Sheet 2
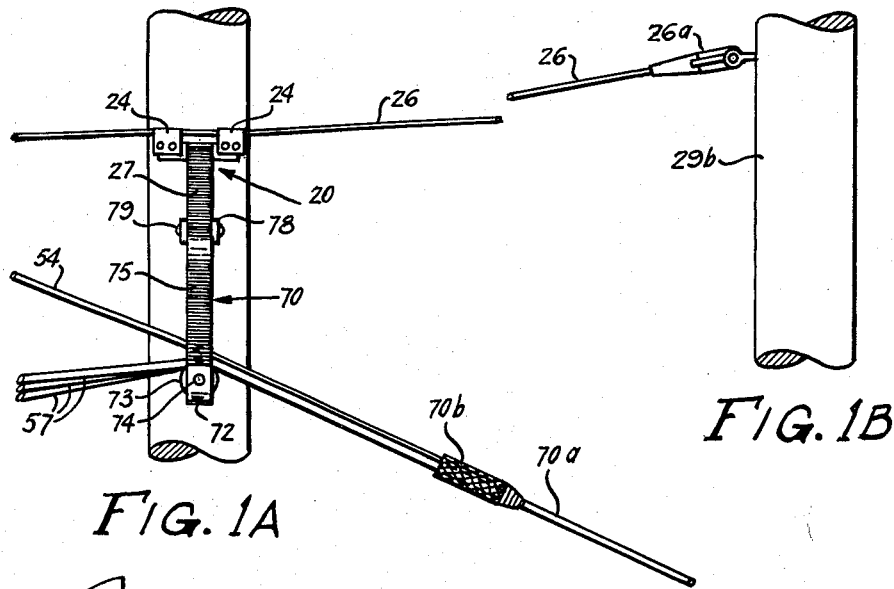
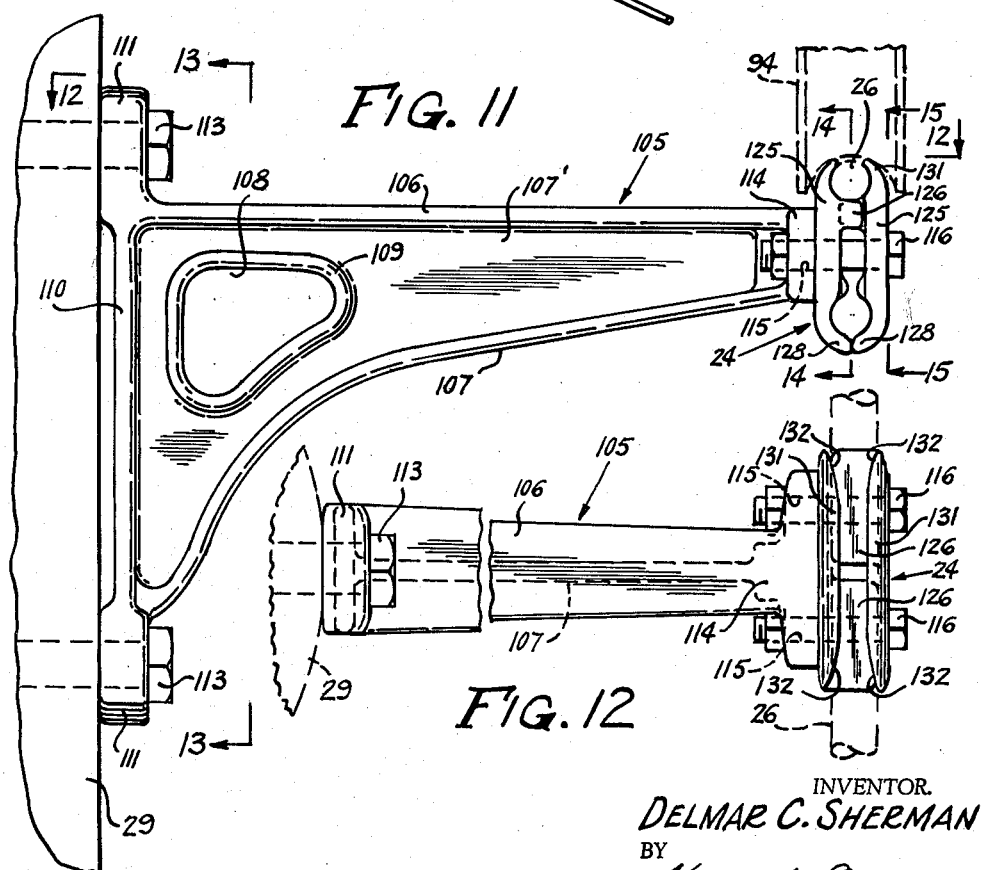
INVENTOR.
DELMAR C. SHERMAN
BY
Kimmel & Crowell
ATTORNEYS.

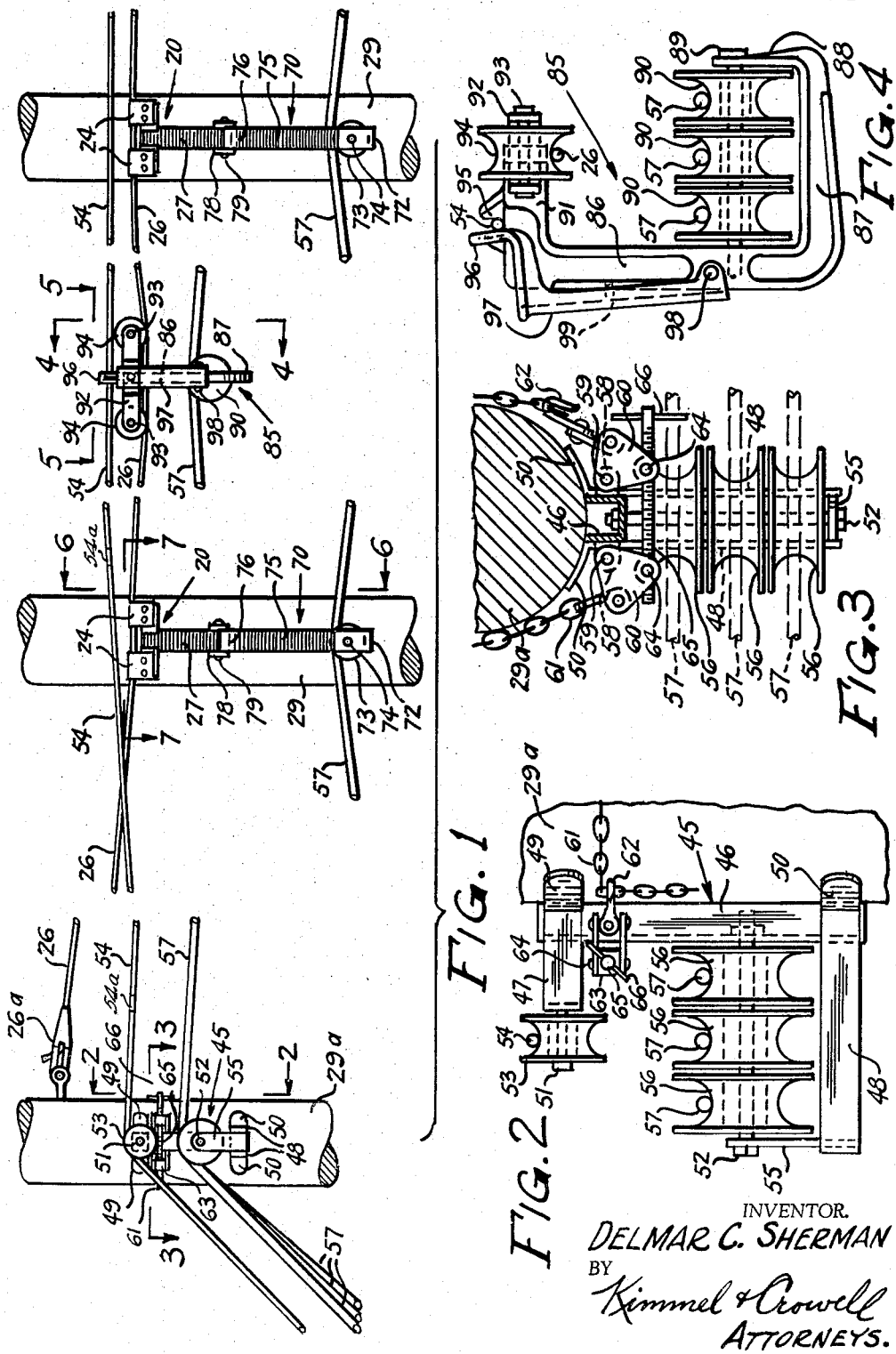

Sept. 1, 1964  D. C. SHERMAN  3,146,994
METHOD FOR THE CONTINUOUS STRINGING OF SPACER TYPE AERIAL CABLE
Filed Feb. 26, 1962  4 Sheets-Sheet 3
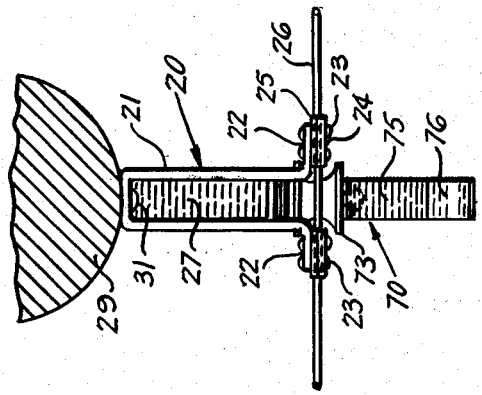
FIG. 7
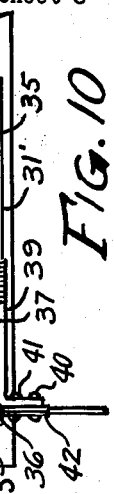
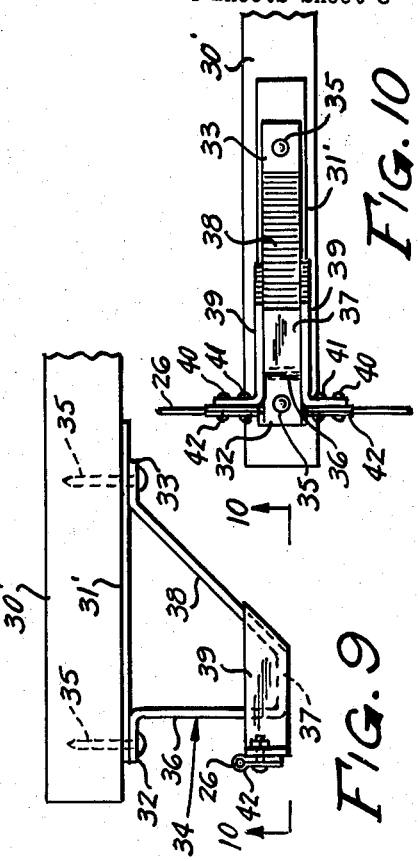
FIG. 10
FIG. 9
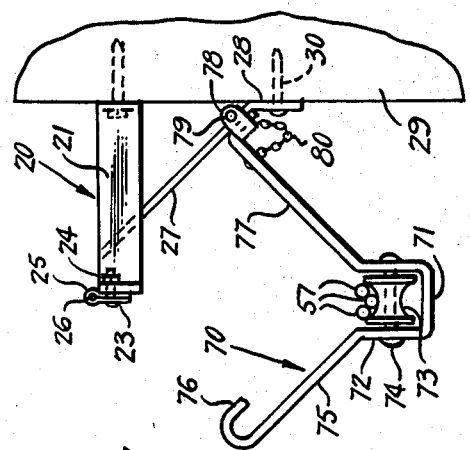
FIG. 6
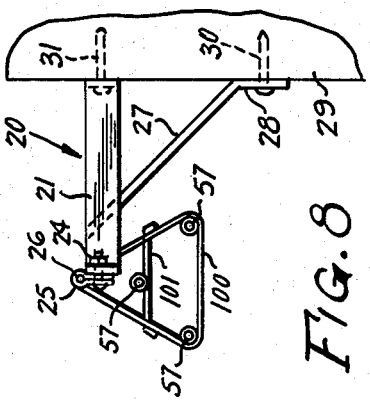
FIG. 8
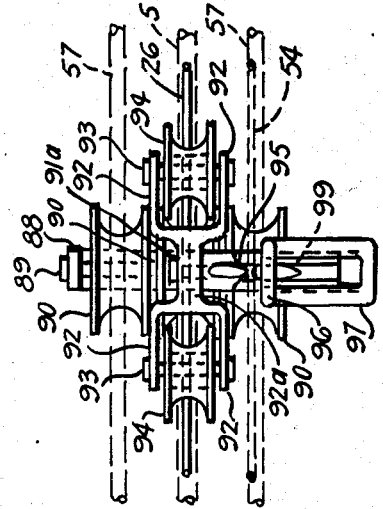
FIG. 5
INVENTOR.
DELMAR C. SHERMAN
BY
Kimmel & Crowell
ATTORNEYS

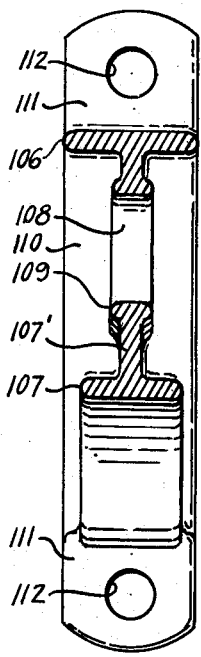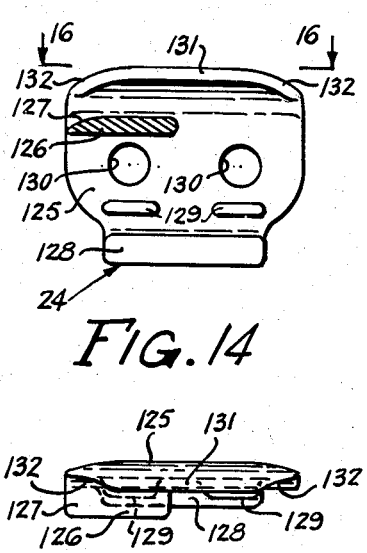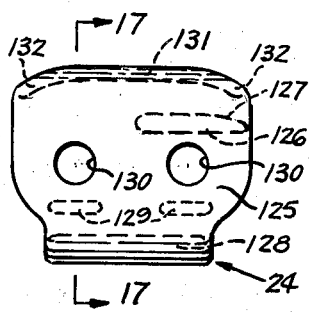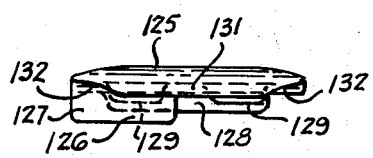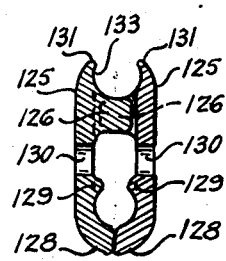

United States Patent Office 3,146,994
Patented Sept. 1, 1964

3,146,994
METHOD FOR THE CONTINUOUS STRINGING OF SPACER TYPE AERIAL CABLE
Delmar C. Sherman, Chattanooga, Tenn., assignor to Sherman & Reilly, Inc., Chattanooga, Tenn.
Filed Feb. 26, 1962, Ser. No. 175,671
4 Claims. (Cl. 254—134.3)

This invention relates primarily to a method of continuous stringing of messenger supported type aerial cable such as power lines, or the like, and secondarily to apparatus employed in the achievement of such a method.

A primary object of the invention is the provision of a method of stringing aerial cable by means of which relatively long lines of cable supported by a multiplicity of poles may be continuously strung without the necessity of removing and replacing component elements of the apparatus therefor.

A further object of the invention resides in a method of this character which is extremely simple and expeditious, and wherein relatively long lengths of cable may be strung with a minimum of time and effort.

An additional and very important object of the invention is the provision of such a method wherein the messenger traveling block moves continually for the length of the cable to be strung without any impediment, stoppage, or change, at the pole.

A more specific object of the invention resides in the combination of an improved messenger traveling block, a messenger bracket which provides a free passage therefor, a pulling line carrier which is employed in association therewith, and an improved lead block which may be readily attached to and detached from the first pole.

Still other objects reside in the steps of the method, the sequence of their performance, the combination of elements, arrangements of parts, and features of construction, all as will be more fully pointed out hereinafter and disclosed in the accompanying drawings.

Still other objects will in part be obvious and in part be pointed out hereinafter.

In the drawings:

FIGURE 1 is a side elevational view, partially broken away, disclosing a plurality of poles, the arrangement of the component parts on and between the several poles, and in part the sequence of operation of the steps of the method.

FIGURE 1A is a continuation of FIG. 1 showing a further step of the method.

FIGURE 1B is a further continuation of FIGS. 1 and 1A showing the attachment of the messenger line to a terminal pole.

FIGURE 2 is an end elevational view of the lead block on the first pole taken substantially along the line 2—2 of FIG. 1.

FIGURE 3 is a sectional view taken substantially along the line 3—3 of FIG. 1.

FIGURE 4 is an end elevational view of the messenger traveling block taken substantially along the line 4—4 of FIG. 1 as viewed in the direction indicated by the arrows.

FIGURE 5 is a top plan view of the messenger traveling block of FIG. 4, certain associated elements being indicated in dotted lines.

FIGURE 6 is an end elevational view of the messenger bracket and pulling line carrier in assembled relation taken substantially along the line 6—6 of FIG. 1.

FIGURE 7 is a top plan view of the structure of FIG. 6 taken substantially along the line 7—7 of FIG. 1.

FIGURE 8 is an end elevational view showing the completed assembly with the pulling line carrier removed and the spacer positioned at the messenger bracket, the cables being sectioned.

FIGURE 9 is an end elevational view of a form of messenger bracket particularly adapted for cross arm mounting.

FIGURE 10 is a bottom plan view taken substantially along the line 10—10 of FIG. 9 as viewed in the direction indicated by the arrows.

FIGURE 11 is a side elevational view of a modified form of messenger bracket.

FIGURE 12 is a top plan view partially broken away, of the bracket of FIG. 11 taken substantially along the line 12—12 of FIG. 11 as viewed in the direction of the arrows.

FIGURE 13 is a sectional view taken substantially along the line 13—13 of FIG. 11 as viewed in the direction indicated by the arrows.

FIGURE 14 is a sectional view taken substantially along the line 14—14 of FIG. 11 as viewed in the direction indicated by the arrows.

FIGURE 15 is a sectional view taken substantially along the line 15—15 of FIG. 11 as viewed in the direction indicated by the arrows.

FIGURE 16 is a top plan view taken substantially along the line 16—16 of FIG. 14 as viewed in the direction indicated by the arrows; and FIGURE 17 is a sectional view taken substantially along the line 17—17 of FIG. 15 as viewed in the direction indicated by the arrows.

Similar reference characters refer to similar parts throughout the several views of the drawing.

Having reference now to the drawings, in detail, a series of messenger brackets 20 are initially installed on each pole of the desired number of poles to be strung. The messenger brackets are permanent installations and may comprise clamps 24 to be more fully described hereinafter, clampingly engaged about a messenger line 26 which is strung the entire length of the sequence of poles and secured to the end poles 29a and 29b in any desired conventional manner, as by means of any suitable conventional securing members 26a. Each messenger bracket is provided with an angularly disposed reinforcing member 27 having an offset vertical end portion 28 which is bolted or otherwise suitably secured to the pole 29 by means of bolts or screws 30. Similar bolts or screws 31 extend through the bight of the U-shaped member 27 for permanently securing the messenger brackets in position.

In the event that the cable is to be installed on a cross arm, a modified form of messenger bracket is shown in FIGS. 9 and 10 wherein the cross arm is designated at 30' and carries on its underside a mounting plate 31' to the underside of which the end portions 32 and 33 of a trapezoidal member generally indicated at 34 are secured by means of bolts 35. The member 34 includes a vertical leg 36, a horizontal portion 37, and an inclined leg 38, the vertical leg 36 terminating in the offset portion 32 and the leg 38 terminating in the offset portion 33. The horizontal member 37 has secured thereto a U-shaped bracket 39, the securing taking the form of welding or the like, and has bolted to its offset ends 40 as by means of bolts 41 clamping members 24 which carry the messenger line 26 in a manner identical to that of the previously disclosed modification.

A lead block generally indicated at 45 is then mounted on the first pole 29a of the series of poles. Lead block 45 is comprised of a vertical channel iron 46 at the upper and lower extremities of which are positioned U-shaped brackets 47 and 48 having arcuate extremities 49 and 50, respectively, adapted to engage the circumference of the pole 29a. The members are secured in position by suitable bolts 51 and 52, respectively, the upper bolt 51 serving as an axle for an upper sheave 53, which is adapted to carry a space line or lead line 54 to be described more fully hereinafter. The bolt 52 which is carried by an upright 55 extending from the lower bracket 48 at one end, and at its other end engaged to the upright channel iron 45 carries a plurality, illustratively three, parallel aligned sheaves 56 which are designed for the accommodation of the cables 57 in a manner to be more fully described hereinafter.

A pair of ears 58 extend transversely from the sides of the member 46 at an intermediate point and have pivotally secured thereto as by means of pivots 59 triangular plates 60. Each plate 60 has secured thereto one end of a chain 61 adapted to encircle the pole 29a, one of the plates 60 being provided with a hook 62 which may be suitably secured through any link of the chain adjacent the end for the purpose of taking up the major portion of any slack which exists in the chain. Swivel blocks 63 are secured as by pivot pins 64 to the third apex of the triangular plate 60 and are provided with threaded bores through which extends a screw member 65 provided with an operating handle 66, the arrangement being such that rotation of the screw 65 clampingly tightens the chain 61 about the pole 29a, or alternatively loosens the same enough to permit its disengagement from the hook 62.

Pulling line carriers, generally indicated at 70, are then installed on the messenger brackets 20. Pulling line carriers 70 comprise in the embodiment of the invention herein shown, a U-shaped member 71 between the side wall 72 of which is positioned a rotatable sheave 73 mounted on an axle 74 for the support of a pulling line 70a. An offset arm 75 extends outwardly relative to its associated pull and terminates in an arcuate portion 76 which is reverted, and serves to prevent pulling line 70a from riding out of the slack carrier. An oppositely disposed diagonal arm 77 is provided with an offset end portion 78 which has a pair of ears 79 extending from opposite sides thereof which are adapted to be positioned on opposite sides of diagonal support members 27 and held in position by means of a pin 79 which is permanently attached to the member 77 by means of a chain 80.

Pulling line 70a which is preferably, though not necessarily, comprised of ¾ inch fiber rope, is then pulled out through all the pulling line carriers and over the lead block 45 to ground level, and attached, as by means of a conventional sock 70b, to one end of the space line 54 and cables 57. Space line 54, which may be of any desired material or weight, is preferably comprised of three-eighths inch manila rope, and is suitably marked at predetermined intervals with markers 54a comprising bright colored tape or yarn or string fixedly secured in position in any desired manner. The markers must be accurately placed on the space line at a desired spacing, which may be generally from 30 to 35 feet apart. Both the space line and the cables may be suitably mounted on conventional reels on the ground (not shown).

Pulling line 70a is then pulled until the three cables 57 have passed over the sheaves 56 of lead block 45, with the space line 54 simultaneously traveling over the sheave 53.

At this time, as the first marker on the space line 54 is reached, a messenger traveling block, generally indicated at 85, is attached to the space line. The messenger traveling blocks are best shown in FIGS. 4 and 5 and comprise a generally C-shaped frame having an upright bight portion 86 and a lower leg 87 which has an upright 88 at the end thereof from which an axle 89 extends inwardly and carries a plurality of sheaves 90 for the accommodation of the several cables 57.

The upper horizontal leg 91 of the C-shaped member 85 carries a horizontal pin 91a upon which is mounted a truck frame 92a having oppositely positioned bifurcations 92 which by means of axles 93 carry longitudinally aligned truck wheels or sheaves 94 which ride along the messenger line 26.

A clamping lug 95 is positioned on the upper side of leg 91 and is adapted to be engaged by space line 54, an opposite clamping lug 96 mounted on an arm 97 serving to hold the line 54 in clamped relation. The arm 97 is pivoted as by a pivot 98 to the bight 86 of member 85, and is spring biased in the clamping position as by means of an internally positioned spring 99.

Further tension exerted on the pulling rope causes the block 85 to travel along the messenger line until the next marker on the space line is approached, at which time an additional messenger traveling block is placed on the space line, the operator holding clamping arm 97 in open position until the marker is reached at which time he releases his grip to allow the additional block to be clamped to the space line and start traveling, mounted on the messenger line, and engaged beneath the multiple cables 57. All of the messenger traveling blocks are attached at a point immediately adjacent the lead block, and at the suitable spaced intervals indicated by the markers on the line. Pulling continues without interruption until the first block put on at the lead pole 29a arrives at a point 30 to 35 feet from the dead end. A suitable block may be attached to the last pole leading down to the butterfly on a truck or any other suitable means provided for pulling.

It is to be noted that the messenger traveling blocks ride smoothly and freely over the clamps 24 at the outer end of messenger bracket 20 so that pulling may be continuous and uninterrupted throughout the entire length of the string of poles. It should also be noted that by virtue of the C-shaped configuration of the messenger traveling blocks they may be engaged over the messenger line and beneath the multiple cables with a minimum of time and effort and while a continuous pull is exerted on the lines.

A further modified form of mounting bracket or messenger bracket for supporting messenger line 26 is disclosed in FIGURES 11 and 12. In this simplified form of bracket an arm comprised of a single casting is generally indicated at 105, and includes an upper transverse flange 106 and an arcuate lower flange 107. A central opening 108 which is provided with a peripheral rim 109 is provided in the triangular web 107 and serves as a means for securing either the pulling line carrier 70 previously described, or any other suitable pulling line carrier thereto. The inner side of arm 105 adjacent the pole 29 is characterized by a transverse web or flange 110 and offset end portions 111 at the opposite ends thereof which are apertured as at 112 (see FIG. 13) to receive appropriate securing bolts 113. The outer end of arm 105 carries a transverse terminal piece 114 which is apertured as at 115 for the reception of bolts 116. The bolts 116 are employed to apply the clamping members 24 previously mentioned in connection with the other modifications of this invention to the end of the arm in the position securely to hold the messerger cable or line 26 so that the truck wheels or sheaves 94 may ride smoothly thereover without disengagement. As best shown in FIGS. 14 and 15, each unit 24 is comprised of a pair of conforming opposite clamping members 125 and 126, each of which is provided with an opposite internal transverse protuberance 126 inclined as at 127 toward the outer end thereof. Suitable inwardly turned flanges 128 are complementarily arranged to engage at the lower extremity of the clamp as best shown in FIGURE 17. Spacers 129 are provided internally of the clamping plates, adjacent and below bolt holes 130, which accommodate in the form of the invention herein being discussed the bolts 116. Obviously, however, when the clamps are employed with the brackets of the previous modifications, bolts 25 may be similarly applied. Each clamping member 24 is provided at its upper extremity with a flange 131 which tapers downwardly at its opposite ends as at 132, and tapers arcuately inwardly as best shown in FIGS. 17 and 11 for the purpose of clampingly engaging the messenger line 26 and holding the same securely in position. The top of the messenger linge 26 is in substantial alignment with the arcuate outer curvature of the flanges 131 so that the wheels or sheaves 94 ride smoothly over each clamping plate without any interruption or interference with the travel of the traveling block during its passage over the entire linear extent of the line.

It is to be noted from FIGURES 16 and 17 that the protuberances 126 extend substantially the full width of the space between the clamps and form spacers as well as under supports for the messenger 26. It should also be noted that the members 126 extend only half of the longitudinal area of the oppositely disposed clamping members, so that the clamps when interengaged will align the members 126 linearly along the two faces of the clamp to provide a firm support for the base of the messenger wire 26.

While other forms of clamp may be employed with any of the messenger brackets hereinbefore described or others, it is to be understood that an important feature of the instant invention is the ability of the messenger traveling block to ride smoothly and evenly over the clamps continuously along the entire line.

After the final pole is reached it will be noted that a messenger traveling block is attached to the line in the exact position in the spans where spacers or other suitable supports are to be installed. By this arrangement a block may also be positioned at each pole, permitting the attachment of spacers here also.

The spacers, as best shown in FIG. 8, may be conventional triangular spacers generally indicated at 100, and provided with conventional means for attaching two of the three cables 57 at opposite corners of their bases, with the third cable 57 conventionally attached to an intermediate cross member 101. The apex of the spacer is secured to the messenger line 26 which forms part of the permanent installation. Obviously, other forms of spacers may be used to prevent sagging, and to support more or less than three cables.

The pulling line carriers 70 are removed after the mounting of the spacers, or other supports, as are the several messenger traveling blocks 85, and are then ready for reuse on the next group or string of poles, or in any other desired locality.

From the foregoing it will now be seen that there is herein provided an improved method for the continuous stringing of messenger supported cable which substantially reduces the installation cost, and which obviates the necessity of stopping or transferring at each pole, permitting continuous stringing from start to finish of a section of line, and which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. A method for the continuous stringing of spacer type multiple cables between a plurality of poles which comprises the steps of attaching a lead block to the first of said plurality of poles, securing messenger brackets to each remaining pole, extending a messenger line along said brackets and securing said line in fixed relation to said bracket, attaching pulling line carriers to said messenger brackets, extending a premarked space line having spaced markings thereon over said lead block, extending the multiple cables to be strung over said lead block, securing the ends of said space line and said cables together, attaching a pulling line to said secured ends, pulling on said pulling line and said cables until the first of said markings passes said lead blocks, attaching a traveling block to said space line at the point of marking while simultaneously supporting said cables from said messenger line by means of said traveling block, pulling said space line and said cables continuously while attaching an additional traveling block at each marking, said traveling blocks being so constructed as to pass freely over each messenger bracket, continuing the pulling of said cables and space line until the terminal pole of said multiplicity of poles is reached, permanently installing a cable support at each traveling messenger block, securing said cables to said messenger line, removing said traveling messenger blocks, and removing said pulling line carriers.

2. The method of claim 1 wherein said space line is marked at such intervals as to insure the correct positioning of traveling blocks to enable proper location of permanent support.

3. The method of claim 2 wherein the spacing of the markings is substantially equidistant.

4. The method of claim 2 wherein a pulling line is attached to the ends of said space line and said cables and extending over said pulling line carriers for the entire length of said plurality of poles.

References Cited in the file of this patent

UNITED STATES PATENTS

| | | |
|---|---|---|
| 581,242 | Viele | Apr. 20, 1897 |
| 1,676,584 | Tideman | July 10, 1928 |
| 2,983,037 | Hendrix | May 9, 1961 |
| 3,012,756 | Cronkright | Dec. 12, 1961 |
| 3,018,998 | Eitel | May 9, 1962 |